May 14, 1935.   J. W. ROCKEFELLER, JR   2,000,905
HELICAL SPRING
Filed Sept. 1, 1933
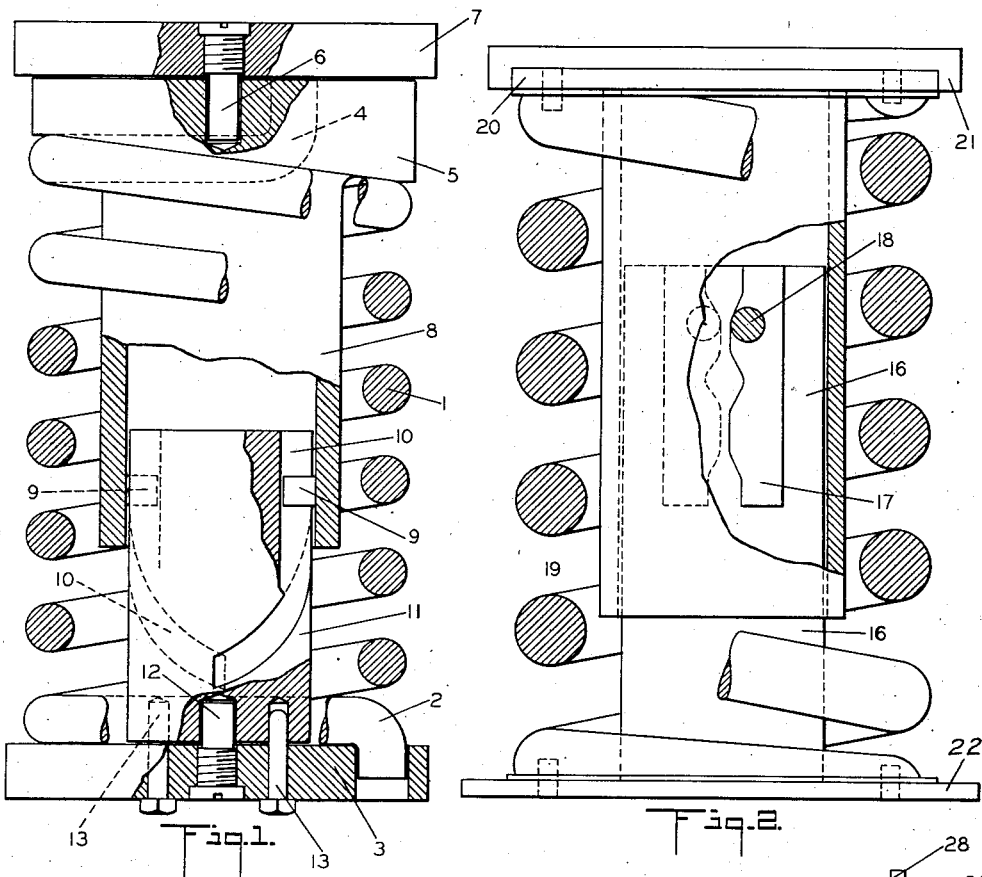
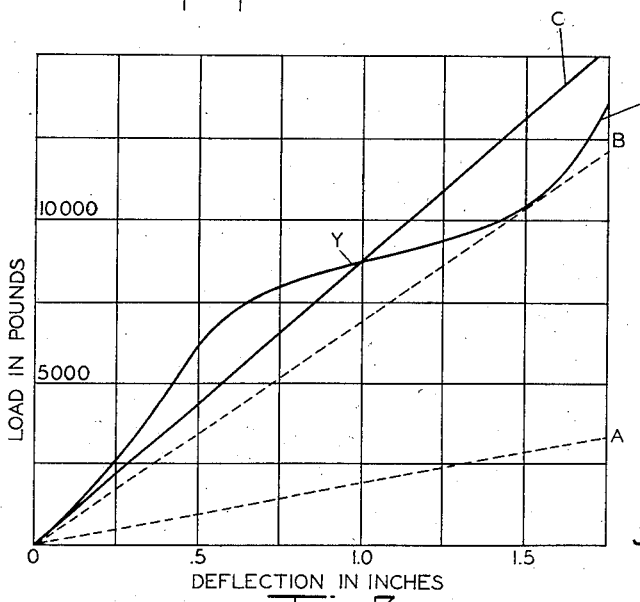
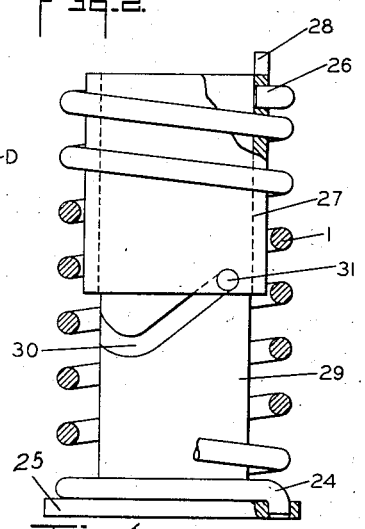
Fig.1.  Fig.2.  Fig.3.  Fig.4.
INVENTOR
JOHN W. ROCKEFELLER, JR.
BY
ATTORNEY Patented May 14, 1935

2,000,905

UNITED STATES PATENT OFFICE 2,000,905

HELICAL SPRING

John W. Rockefeller, Jr., New York, N. Y.

Application September 1, 1933, Serial No. 687,749

9 Claims. (Cl. 267—1)

This invention relates to coil springs and has reference to a method and means for varying automatically or at will the resistance of a coil spring, whether under compression or extension. It has been recognized that a coil spring has when normally designed, a substantially straight line characteristic, and it has further been recognized that such straight line characteristic is objectionable in many instances. For example, coil springs are often made heavier than the duty requires, or are supplemented by leaf springs in series or in parallel, in order to change the characteristic, or are made of varying diameter, or pitch, or both in order to modify such inherently objectionable characteristic. It is also known, as for instance in coil compression springs used in railway trucks, especially high speed, that the natural period of vibration synchronizes with the vertical truck movements due to rail joints, irregularities in the track, etc., thereby building up harmonic vibrations until the springs go solid or break. The purpose of combining leaf springs with coil springs has been to alter the normal characteristic, and reduce or suppress harmonics.

According to this invention, the normal characteristic of a coil spring is altered by varying its torsion during a predetermined portion of its variation in length, whereby its normal straight line characteristic is modified, and also a spring of given size rendered capable of sustaining a greater load. In general, I accomplish this by so mounting a coil spring subject to compression or extension, that, as its length is varied, its torsion is varied either by winding up or unwinding. This result is conveniently effected in the simple illustrative embodiment herein shown by a relatively fixed cam which varies the torsion of the spring as its length varies, and gives the spring a resultant controllable characteristic varying with the design of the cam. A coil spring embodying this invention can be converted into an ordinary spring by disconnecting the cam so that it becomes inoperative to control the torsion of the spring.

In the accompanying drawing:

Fig. 1 is a view partly in section of a spring embodying the invention, suitable for insertion in a car truck, for example, in place of a standard coil spring;

Fig. 2 is a similar view of a modification;

Fig. 3 is a diagram showing characteristics of two standard coil springs, and the modified characteristics effected with this invention; and Fig. 4 shows a modification in which torsion applied to the spring effects compression.

In Fig. 1, 1 is a coiled spring of circular, oval or other desired cross section, having one end 2 anchored in plate 3 and the opposite end 4 anchored in plate 5, which is rotatably connected, as by pin 6, to plate 7. For some uses, it may be desirable to provide roll or ball bearings between plates 5 and 7. Plate 5 carries an extension 8 within the coil 1 which carries pin 9 sliding in the grooves 10 of cam body 11 which is centered on plate 3 by pin 12. The cam 11 is held against rotation by detachable pins 13 passing through plate 3 into the cam body. When pins 13 are removed, the cam can rotate as the spring is compressed or lengthened and thus becomes ineffective, leaving the device an ordinary spring. When the pins 13 are connected as shown, the cam is fixed, and shortening or lengthening of the spring will cause the spring to wind or unwind, depending upon the design of the cam, the degree of deflection and direction of motion, by reason of the plate 5, turning on plate 7. As shown in the drawing the spring winds up when compressed owing to the relation of the cam curve to the coil of the spring. If it is desired to unwind the spring when compressed, the cam curve would be reversed.

In Fig. 2 is shown a modification wherein the cam curve alternately winds and unwinds the spring during compression by means of specially designed cam 16 having slots 17 in which travel the pins 18 mounted on cylinder 19. 20 is the rotary end plate turning in stationary plate 21, and opposite plate 22 is also stationary.

Fig. 3 shows the characteristics of several springs, in which A is the characteristic of an A. R. A. inner railway truck spring, B an A. R. A. outer spring, C the combination of A and B together in one truck, and D the varying characteristic of the single spring of Fig. 2. This figure shows graphically how the normal straight line characteristic of a coil spring can be varied at any desired point by the proper design of the cam.

In Fig. 4, the torsion spring 1 has one end 24 stationary in plate 25, and its other end 26 rotatable by means of tube 27 having actuating lug 28 to which rotary movement is applied by any suitable means not shown. On the base is fixed block 29 having cam groove 30 in which works pin 31 on tube 27. This arrangement of cam will give a torsion characteristic similar to the portion D of Fig. 3, but can be designed to give any other desired characteristic.

Useful applications of this invention will be in railroad car suspension, automobile suspension, automobile shock absorbers, automobile valve springs, door checks and closers, vibration elimination devices, even tension devices, window springs, draw bar springs, automatic controlling devices, safety valves (boiler and other pressure vessels), shade roller and metal door roller springs, spring hinges, ammunition springs, brush holder springs, recording gauge springs and numerous other devices employing coil springs where a variable characteristic is desired.

Various modifications and changes may be made without departing from the scope of the appended claims.

The invention claimed is:

1. A helical spring in combination with means for automatically torquing and untorquing same as the spring is progressively deflected axially.

2. A helical spring in combination with means for automatically torquing and untorquing same as the spring is progressively extended.

3. A helical spring in combination with means for automatically torquing same during its initial stages of axial deflection and reducing torque during its later stages of axial deflection.

4. A helical spring in combination with means for automatically torquing and untorquing same in such manner as to give a varying and predetermined increment of axial deflection for a given increment of axial loading at different stages of axial deflection.

5. A helical compression spring in combination with means for torquing same during its initial stages of compression and untorquing same during its later stages of compression in such manner as to create a high stress in the material during the initial stages of compression and a relatively small increase in stress during the later stages.

6. A helical torsion spring having one end subject to torsion and the other end fixed, and cam means for torquing and untorquing the spring as it is axially deflected.

7. In a spring mounting, a helical spring unconfined for substantial radial expansion and contraction, means for automatically torquing the spring during its initial stages of axial deflection and reducing torque during its later stages of axial deflection.

8. A helical spring in combination wth means for automatically torquing the same as it is deflected axially, said means producing through a variable torquing resistance a substantial and predetermined modification of the ordinary straight line load deflection characteristic of the spring.

9. A helical spring in combination with means for automatically torquing same as it is deflected axially, said means effecting torsion at such a variable rate as to produce by means of torquing resistance a spring combination having a high axial resistance under lesser loads and a lower axial resistance under greater loads.

JOHN W. ROCKEFELLER, Jr.